US006375160B1

(12) United States Patent
Hung

(10) Patent No.: US 6,375,160 B1
(45) Date of Patent: Apr. 23, 2002

(54) JACK BOARD ASSEMBLY FOR THE JACK LIFT OF A GARAGE JACK

(75) Inventor: Michael Hung, Lu Chu Hsiang (TW)

(73) Assignee: Shinn Fu Corporation, Lu Chu Hsiang (TW)

(*) Notice: Subject to any disclaimer, the term of this patent is extended or adjusted under 35 U.S.C. 154(b) by 0 days.

(21) Appl. No.: 09/850,098

(22) Filed: May 8, 2001

(51) Int. Cl.[7] .................................................. B60P 1/48
(52) U.S. Cl. ............... 254/8 B; 254/133 R; 254/DIG. 4
(58) Field of Search ............................ 254/8 B, 133 R, 254/134, 2 B, 6 B, 7 B, 93 L, DIG. 4, 131

(56) References Cited

U.S. PATENT DOCUMENTS 3,993,286 A * 11/1976 Greene et al. .............. 254/8 B
4,688,759 A * 8/1987 Gray ............................. 254/1
H1823 H * 12/1999 Wolford ................. 254/133 R
6,109,593 A * 8/2000 Craychee .................... 254/8 B

* cited by examiner

*Primary Examiner*—Joseph J. Hail, III
*Assistant Examiner*—Lee Wilson
(74) *Attorney, Agent, or Firm*—Varndell & Varndell, PLLC

(57) ABSTRACT

A jack board assembly fixedly mounted on the lift of a garage jack and adapted to lift a load with the lift, including a jack board having a top recess and top blocks around the top recess, and an anti-skid convex pad mounted in the top recess of the jack and defining with the top recess an air chamber, the anti-skid convex pad having a plurality of air vents for exhaust of air from the air chamber when compressed by the load put on it.

3 Claims, 5 Drawing Sheets

JACK BOARD ASSEMBLY FOR THE JACK LIFT OF A GARAGE JACK

BACKGROUND OF THE INVENTION (a) Field of the Invention

The present invention relates to a garage jack and, more specifically, to a jack board assembly for the jack lift of a garage jack, which comprises a jack board. and an anti-skid pad mounted in the jack board and defining with the jack board an air chamber. The anti-skid pad having air vents for exhaust of air from the air chamber when compressed by the load put on it.

(b) Description of the Prior Art

The jack board 10 of a conventional garage jack, as illustrated in FIG. 1, is a circular member comprising an upward peripheral flange 101, and a rubber cushion 20 is mounted on the 15 upward peripheral flange 101. The rubber cushion 20 is an annular rubber member having an annular bottom mounting groove 201, which receives the upward peripheral flange 101. Because the rubber cushion 20 covers on the peripheral area of the topside of the jack board 10, the load tends to slip when lifting.

SUMMARY OF THE INVENTION

The present invention provides a jack board assembly, which eliminates the aforesaid problem. According to one aspect of the present invention, the jack board assembly comprises a jack board having a top recess and top blocks around the top recess, and an anti-skid convex pad mounted in the top recess of the jack and defining with the top recess an air chamber, the anti-skid convex pad having a plurality of air vents for exhaust of air from the air chamber when compressed by the load put on it. According to another aspect of the present invention, the jack board can be made having circular, rectangular, or triangular shape, or any of a variety of shapes, and the anti-skid pad has a shape fitting the shape of the jack board. According to still another aspect of the present invention, the friction top sidewall of the anti-skid convex pad has an embossed pattern comprising a plurality of raised portions.

DETAILED DESCRIPTION OF THE PREFERRED EMBODIMENT

Figure 1:
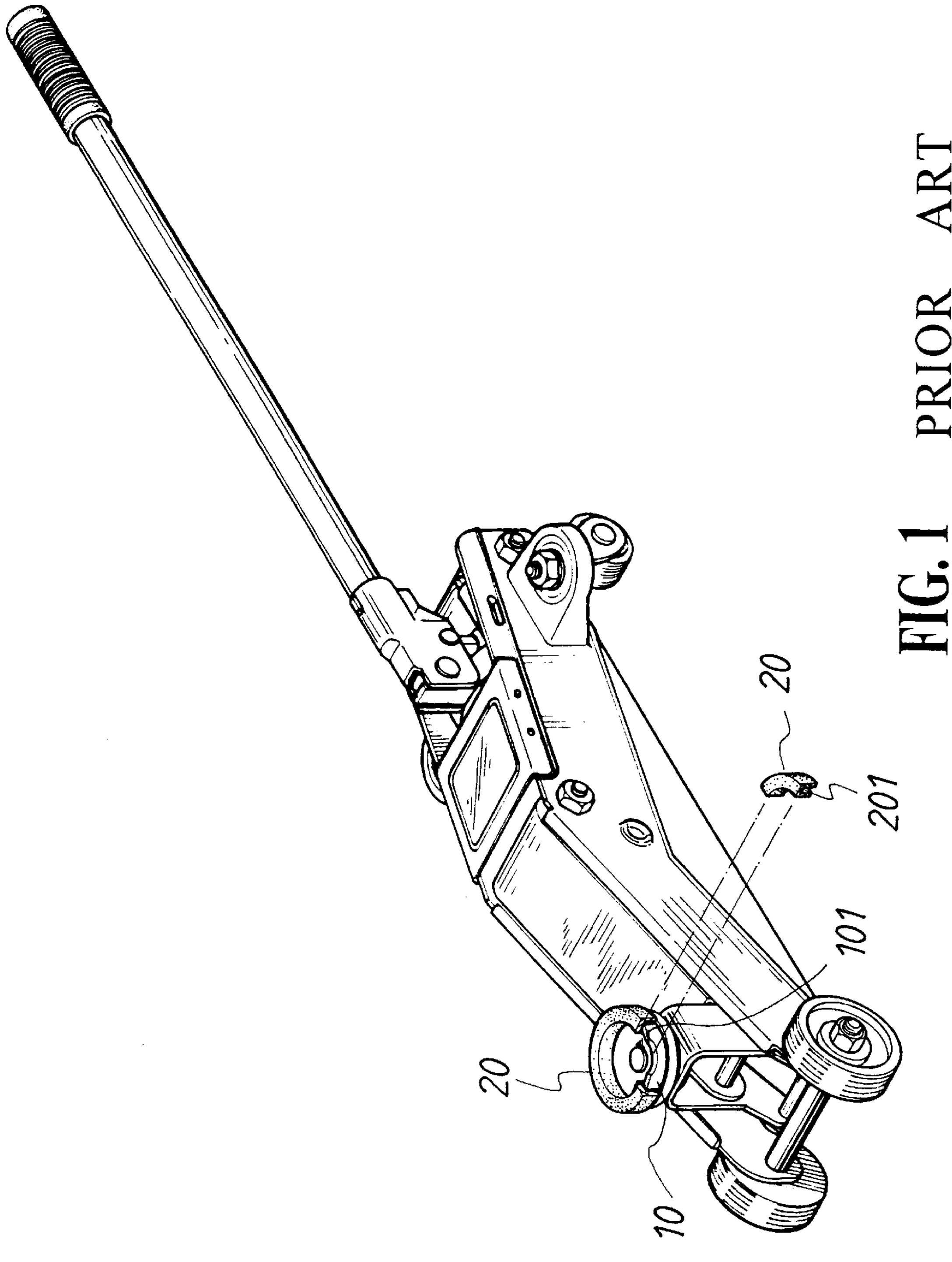
FIG. 1 PRIOR ART
FIG. 1 illustrates a rubber cushion mounted on the periphery of the jack board at the top of the lift of a garage jack according to the prior art.
Figure 2:
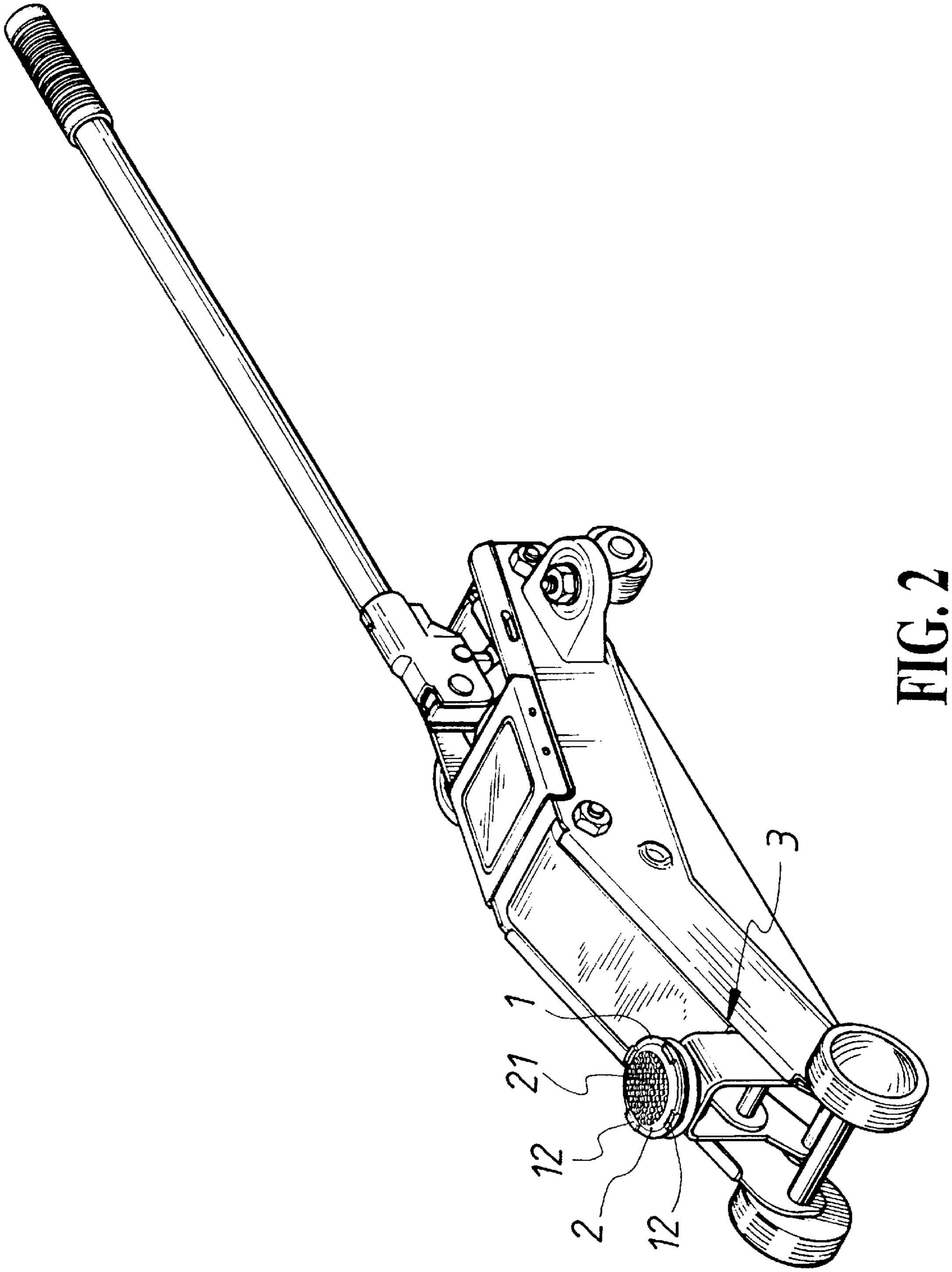
FIG. 2 illustrates a jack board assembly installed in the lift of a garage jack according to the present invention.
Figure 3:
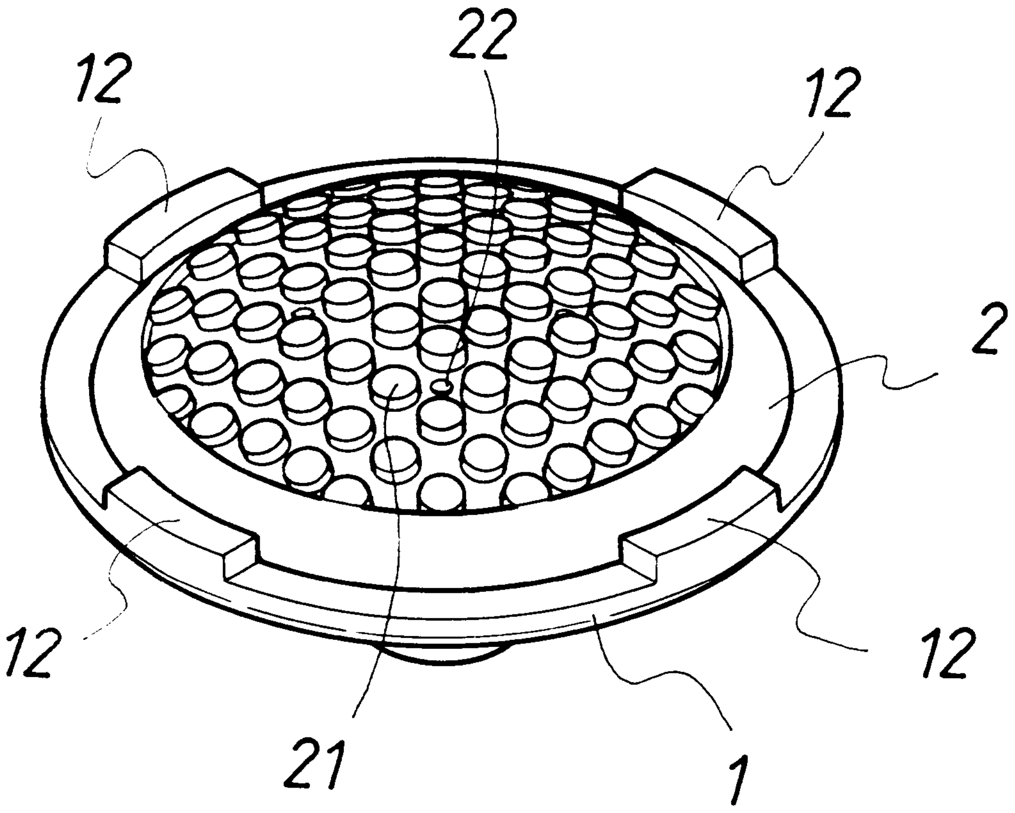
FIG. 3 is an elevational view of a jack board assembly according to the present invention.
Figure 4:
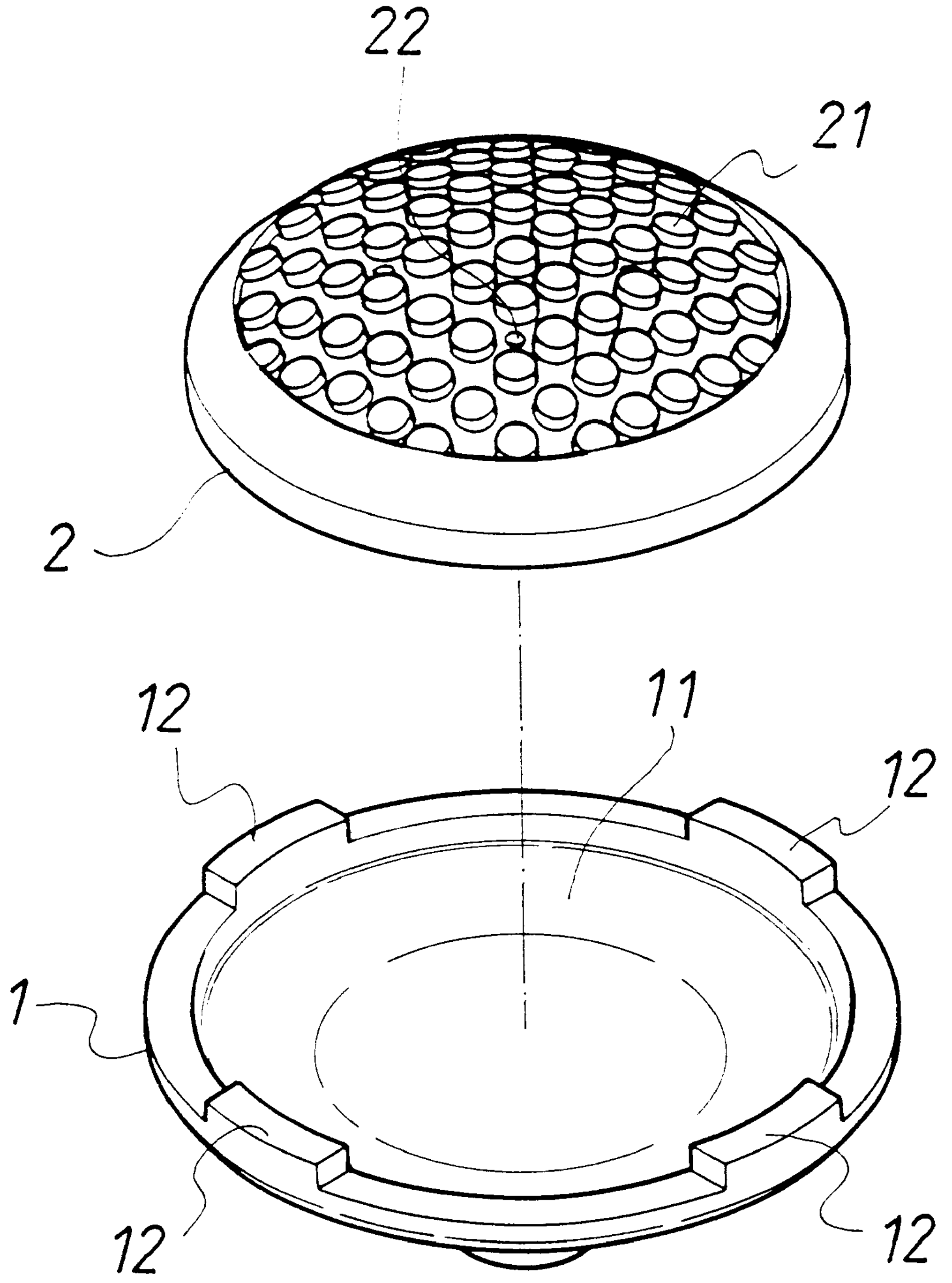
FIG. 4 is an exploded view of the jack board assembly according to the present invention.

Referring to FIGS. from 2 through 5, a jack board assembly is shown comprised of a jack board 1, and an anti-skid convex pad 2 mounted in the top recess 11 of the jack board 1.

The jack board 1 is fixedly mounted on the topside of the lift 3 of a garage jack. The jack board 1 can have a circular, rectangular, or triangular profile, or any of a variety of shapes. Multiple top blocks 12 are disposed at the topside of the jack board 1 and equiangularly spaced around the top recess 11. The anti-skid convex pad 2 fits the shape of the top recess 11 of the jack board 1, having a friction top sidewall 21 and at least one air vent 22 through the friction top sidewall 21. The friction top sidewall 21 is an embossed wall having raised portions of any of a variety of patterns.

Figure 5:
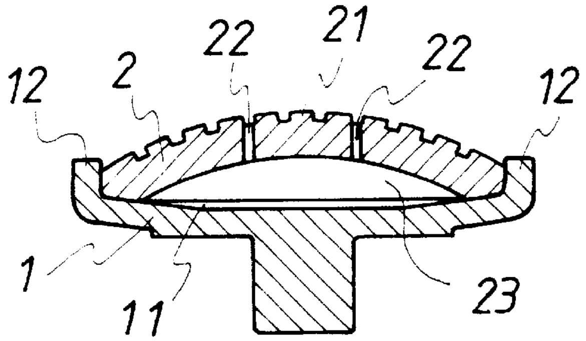
FIG. 5 is a section view of the jack board assembly according to the present invention.
Figure 6:
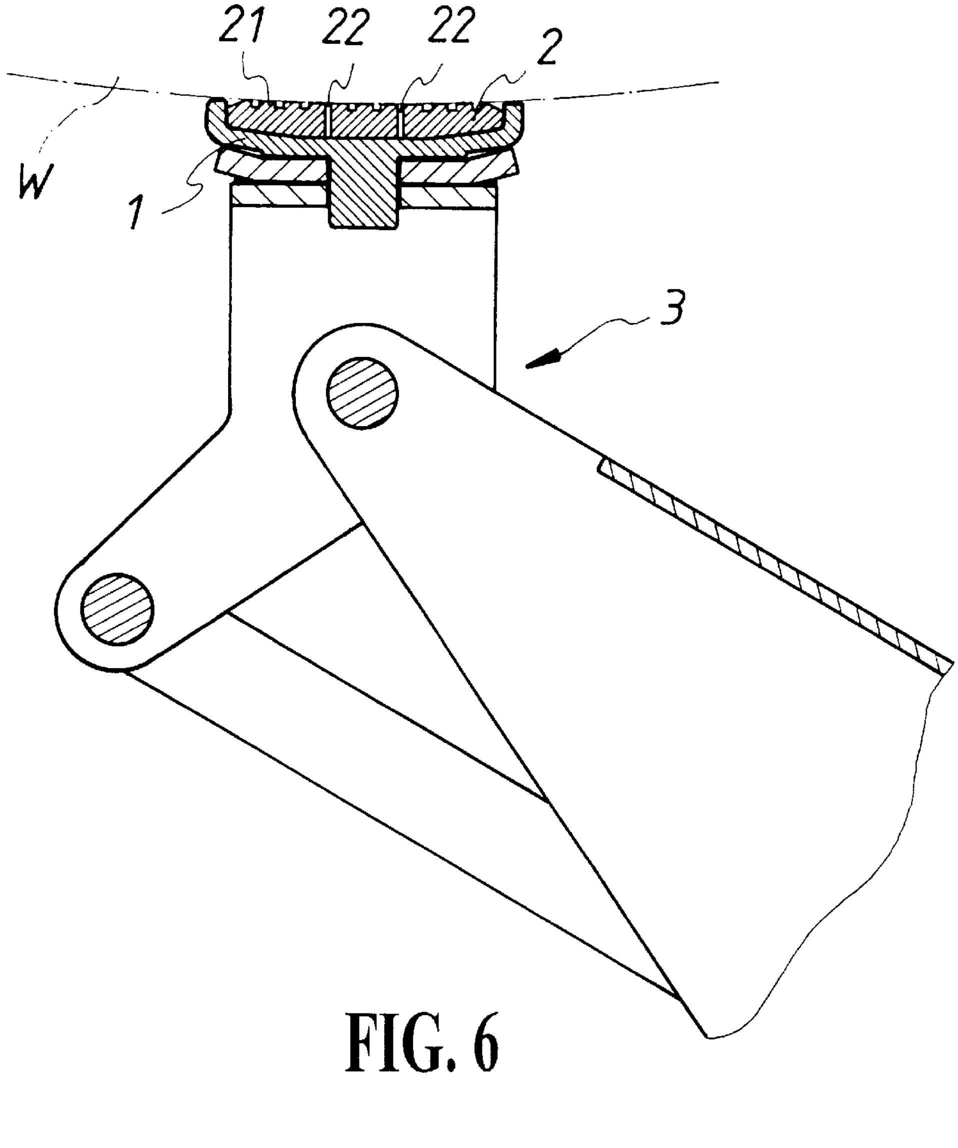
FIG. 6 is an applied view of the present invention showing the anti-skid convex pad compressed, the load supported on the top blocks of the jack board.

After installation of the anti-skid convex pad 2 in the top recess 11 of the jack board 1, the anti-skid convex pad 2 defines with the top recess 11 of the jack board 1 an air chamber 23. When not in use, the topmost edge of the friction top sidewall 21 protrudes over the elevation of the topmost edge of the top blocks 12 of the jack board 1. When bearing the load W, the friction top sidewall 21 of the anti-skid convex pad 2 is positively stopped against the bottom sidewall of the load W and squeezed inwards to expel air out of the air chamber 23 through the air vents 22 (see FIGS. 5 and 6), enabling the top blocks 12 to support the weight of the load W. Because the friction top sidewall 21 of the anti-skid convex pad 2 is positively stopped against the bottom sidewall of the load W during lifting, the load W does not slip on the jack board 1.

A prototype of jack board assembly has been constructed with the features of FIGS. 2~6. The jack board assembly functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A jack board assembly comprising:

a jack board, said jack board comprising a top recess and a plurality of top blocks equiangularly spaced around said top recess; and an anti-skid convex pad fixedly mounted in said top recess of said jack board and defining with said top recess an air chamber, said anti-skid convex pad having a friction top sidewall curved outwards and at least one air vent through said friction top sidewall in communication with said air chamber.

2. The jack board assembly of claim 1 wherein said anti-skid pad has a shape fitting the shape of said jack board.

3. The jack board assembly of claim 1 wherein said friction top sidewall of said anti-skid convex pad has an embossed pattern.

* * * * *